US012685269B2

(12) United States Patent
Davis

(10) Patent No.: US 12,685,269 B2
(45) Date of Patent: Jul. 21, 2026

(54) MIS-TIE DETECTION FOR BALER KNOTTER

(71) Applicant: AGCO Corporation, Duluth, GA (US)

(72) Inventor: James Michael Davis, Hesston, KS (US)

(73) Assignee: AGCO Corporation, Duluth, GA (US)

(*) Notice: Subject to any disclaimer, the term of this patent is extended or adjusted under 35 U.S.C. 154(b) by 0 days.

(21) Appl. No.: 19/224,960

(22) Filed: Jun. 2, 2025

(65) Prior Publication Data

US 2025/0366402 A1     Dec. 4, 2025

Related U.S. Application Data

(60) Provisional application No. 63/654,252, filed on May 31, 2024.

(51) Int. Cl.
A01F 15/14     (2006.01)

(52) U.S. Cl.
CPC .......... A01F 15/148 (2013.01); A01F 15/145 (2013.01)

(58) Field of Classification Search
CPC ...... A01F 15/145; A01F 15/148; B65H 69/04
See application file for complete search history.

(56) References Cited

U.S. PATENT DOCUMENTS

| | | | |
|---|---|---|---|
| 4,074,623 A | | 2/1978 | White |
| 4,753,463 A | * | 6/1988 | Strosser ................ A01F 15/148 |
| | | | 100/41 |

| | | | |
|---|---|---|---|
| 4,753,464 A | * | 6/1988 | Jackson ................ A01F 15/148 |
| | | | 289/2 |
| 4,885,991 A | * | 12/1989 | Borba ................... A01F 15/148 |
| | | | 100/4 |
| 5,988,053 A | * | 11/1999 | Leupe ................... A01F 15/148 |
| | | | 200/61.18 |
| 8,671,834 B1 | | 3/2014 | Rotole et al. |
| 8,770,101 B2 | | 7/2014 | Van Groenigen |
| 11,672,205 B2 | | 6/2023 | Regier |
| 12,302,798 B2 | | 5/2025 | Weller et al. |
| 2015/0305247 A1 | | 10/2015 | Chaney |
| 2021/0195843 A1 | | 7/2021 | Regier et al. |
| 2022/0000036 A1 | | 1/2022 | Regier et al. |
| 2022/0000037 A1 | | 1/2022 | Ensminger et al. |

FOREIGN PATENT DOCUMENTS

| | | |
|---|---|---|
| EP | 3199015 A1 | 8/2017 |

* cited by examiner

*Primary Examiner* — Shaun R Hurley

(57)     ABSTRACT

A knotter assembly includes a twine holder and a twine disc assembly having parallel discs for holding twine during a knotting cycle. The knotter assembly further includes a mis-tie detection device configured to monitor the twine being held with the twine holder in a notch of the twine disc. The mis-tie detection device has a movable position indicator positioned adjacent the twine disc. The position indicator has a twine-receiving groove that aligns with the notch in the twine disc such that the twine is simultaneously held in the notch and groove. Tension in the twine during a knotting cycle causes the position indicator to move from a first condition to a second condition. The mis-tie detection device also has a sensing mechanism configured to determine the position of the position indicator.

10 Claims, 5 Drawing Sheets

1

MIS-TIE DETECTION FOR BALER KNOTTER

CROSS-REFERENCE TO RELATED APPLICATION

This application claims the benefit of the filing date of U.S. Provisional Patent Application 63/654,252, "MIS-TIE DETECTION FOR BALER KNOTTER," filed May 31, 2024, the entire disclosure of which is incorporated herein by reference.

BACKGROUND OF THE INVENTION

Field of Invention

This invention relates to relates to agricultural balers having a bale knotting system using twine to bind the bales and, more particularly, to a mis-tie detection system for the bale knotting system.

Description of Related Art

Agricultural balers for binding bales of crop materials with strands of a binding material, such as twine, are well known in the art. Typically, balers are equipped with means to wrap twine around the formed bale and tie off the twine to secure the bale. This includes a knotter assembly having a knotter disc rotated by a powered drive shaft that controls a rotational movement of the components of the knotter assembly. Agricultural balers, utilizing knotter assemblies that form two knots on every loop for binding a bale have been available for many years. For example, U.S. Pat. No. 4,074,623, assigned to Hesston Corporation, which is now part of the assignee of this present application, discloses a knotter assembly of the double knotter type. The knotter assembly forms a loop made from two strands of binding material, i.e., one strand from a first supply of binding material along the normally top side of the bale and a second strand from a second supply of binding material along the normally bottom of the bale and its two opposite ends. The two strands thus fully surround the bale and are circumferential complements of one another. Two knots are formed at those locations where the strands are substantially end-to-end. Such a knotter assembly uses a bill hook for forming the knot, a twine disc in combination with a retainer for retaining the strands when forming the knot, and a wiper arm with an integrated cutter for stripping the formed knot from the billhook in combination with the separation of the knot from the retained strands. When a bale reaches its desired length, a knot tying cycle is initiated.

Balers typically are equipped with twine tensioner arms associated with the knotter assemblies to maintain proper tension on the twine to ensure each knotter assembly performs properly. U.S. Pat. No. 11,672,205 entitled Twine Tension Sensor Arrangement, commonly assigned with this present application, discloses a twine tensioner arrangement that enables monitoring of the tension in a strand of twine entering the twine tensioner arrangement and a signaling apparatus to generate a signal the tension exceeds a predetermined value.

A number of factors affect the tension on the twine. If the twine tensioner arm fails to maintain proper tension on the twine, the twine can be pulled out of the knotter assembly and a mis-tie occurs. Sometimes twine gets tangled in the twine box which makes it difficult or impossible for the baler to make knots. Unless an operator is paying close attention, many bales may be improperly tied. Affected bales then need to be re-baled.

It is desired to have an improved detection system that detects when a mis-tie has occurred so that proper remedial action can correct the problem before the problem affects subsequent bales causing excessive rework.

BRIEF SUMMARY

The invention is directed to a knotter assembly for use with a baler, the knotter assembly configured to form knots in strands of a binding material used to secure a formed bale of crop material. The knotter assembly includes a twine disc assembly and a twine holder for maintaining the twine in a suitable position during the formation of the knots. The twine disc assembly includes a plurality of parallel discs mounted for rotation on a shaft, where each disc of the plurality of discs has a plurality of notches spaced around an outer circumference of the twine disc, the strands being held between the twine disc assembly and the twine holder. The knotter assembly further includes a mis-tic detection device configured to monitor the twine being held with the twine holder in one notch of the plurality of notches of the twine disc. The mis-tie detection device has a position indicator movably positioned adjacent the twine disc, where the position indicator has a twine-receiving groove that aligns with the notch in the twine disc such that the twine is simultaneously held in the notch and groove. Tension in the twine during a knotting cycle causes the position indicator to move from a first condition to a second condition. The mis-tie detection device also having a sensing mechanism configured to determine the position of the sensor arm.

These and other features and advantages of this invention are described in, or are apparent from, the following detailed description of various exemplary embodiments of the systems and methods according to this invention.

BRIEF DESCRIPTION OF THE SEVERAL VIEWS OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION OF EXEMPLARY EMBODIMENTS

Figure 1:
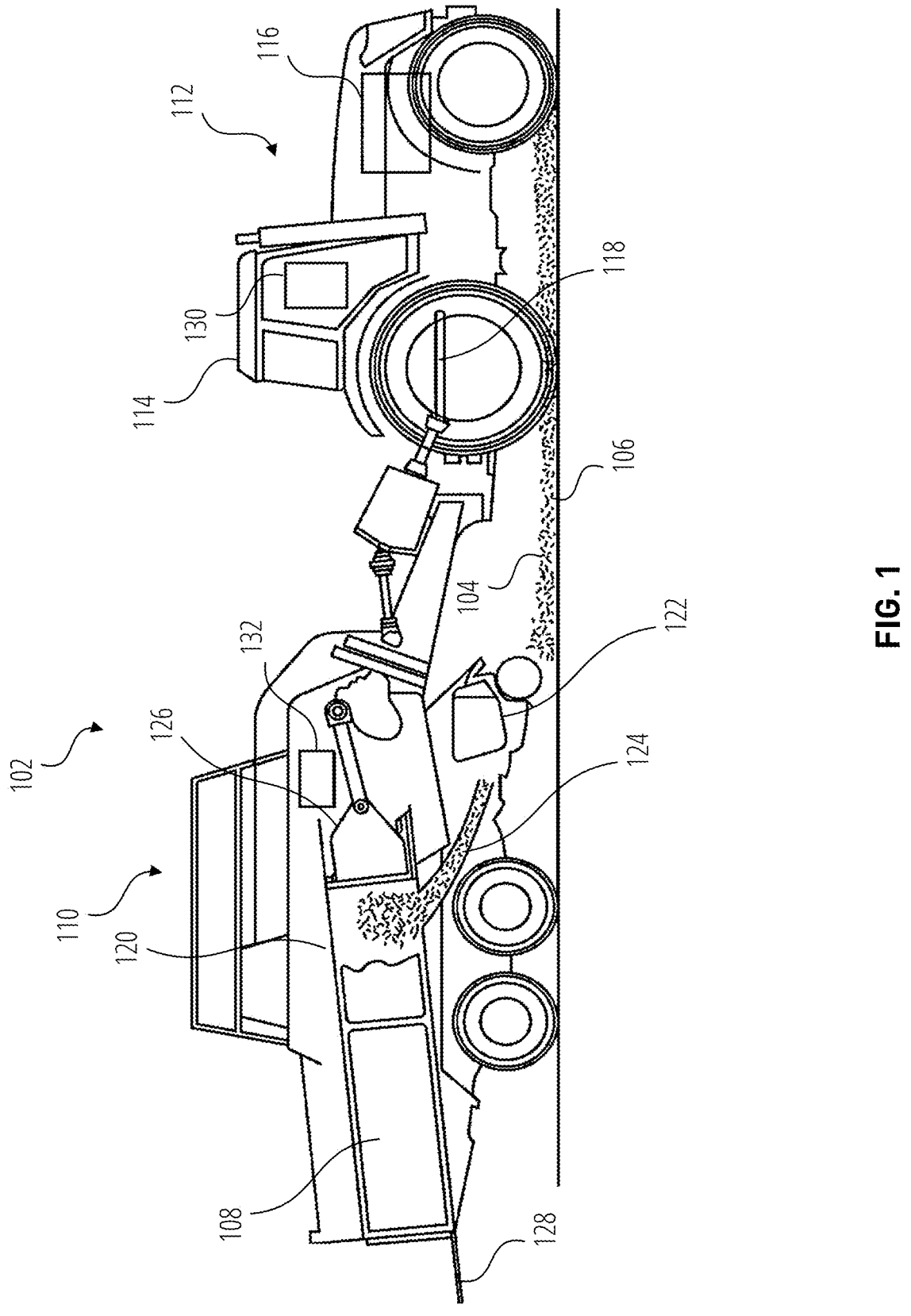
FIG. 1 illustrates an aspect of the subject matter in accordance with one embodiment.

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description. Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail. In the description which follows and in certain passages already set forth, the principles of the present invention will be described in terms of "twine" and "knots" formed in such twine. While twine is used in the exemplary embodiment, the term binding material is intended to mean not only twine made from natural or synthetic fibers, but may also include metallic wire or other strapping material.

As used herein, the singular forms following "a," "an," and "the" are intended to include the plural forms as well, unless the context clearly indicates otherwise. As used herein, the term "may" with respect to a material, structure, feature, or method act indicates that such is contemplated for use in implementation of an embodiment of the disclosure, and such term is used in preference to the more restrictive term "is" so as to avoid any implication that other compatible materials, structures, features, and methods usable in combination therewith should or must be excluded. As used herein, the term "configured" refers to a size, shape, material composition, and arrangement of one or more of at least one structure and at least one apparatus facilitating operation of one or more of the structure and the apparatus in a predetermined way.

As used herein, any relational term, such as "first," "second," "top," "bottom," "upper," "lower," "above," "beneath," "side," etc., is used for clarity and convenience in understanding the disclosure and accompanying drawings, and does not connote or depend on any specific preference or order, except where the context clearly indicates otherwise.

As used herein, the term "about" used in reference to a given parameter is inclusive of the stated value and has the meaning dictated by the context (e.g., it includes the degree of error associated with measurement of the given parameter, as well as variations resulting from manufacturing tolerances, etc.). As used herein, the term "substantially" in reference to a given parameter, property, or condition means and includes to a degree that one skilled in the art would understand that the given parameter, property, or condition is met with a small degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

With reference to FIG. 1, a semi-schematic diagram of an agricultural baler system 102 is shown in which the invention may be employed while baling loose crop material 104 from the ground 106 into formed bales 108. The baler system 102 includes a towing vehicle and a baler 110. The towing vehicle 112 may include a cab 114 wherein an operator may be located, an engine 116 operable to move the towing vehicle, and a power take-off (PTO) 118 operable to transfer mechanical power from the engine 116 to the baler 110. The baler 110 is hitched to the towing vehicle 112 in any suitable manner, and power for operating the various mechanisms of the baler 110 may be supplied by the PTO 118 of the towing vehicle 112. One having ordinary skill in the art should appreciate in the context of the present disclosure that the example baler 110 is merely illustrative.

The baler 110 has a baling chamber 120 within which bales of crop material 104 are formed. The baler 110 is depicted as an "in-line" type of baler wherein the loose crop material 104 is picked up by a pickup assembly 122 and then loaded up into the baling chamber 120 by way of a stuffer chute assembly 124 including a charge forming stuffer chamber.

In the illustrated embodiment, the baler 110 is an "extrusion" type baler in which the bale discharge orifice at the rear of the baler 110 is generally smaller than upstream portions of the baling chamber 120 such that the orifice restricts the freedom of movement of a previous charge and provides back pressure against which a reciprocating plunger 126 can act within the baling chamber 120 to compress charges of crop materials to form the next bale. The dimensions of the discharge orifice and the squeeze pressure on the bales at the orifice are controlled by a compression mechanism as is understood by one skilled in the art.

The reciprocating plunger 126 presses newly introduced charges of crop material against a previously formed and tied bale to form a new bale. This action also causes both bales to intermittently advance toward a rear discharge orifice of the baler 110. The completed bales 108 are tied with binding material, for example twine. Once tied, the bales are discharged from the rear end of the bale-forming chamber onto a discharge platform in the form of a chute 128.

A display 130 communicates with an electronic control unit (ECU) 132. The ECU 132 may also be in electronic or other communication with various components and devices of the baler 110 (and/or the towing vehicle 112). Conveniently such communication may be enabled by way of a suitable data communication network such as one compliant with the ISOBUS standard (a network in conformance to ISO 11783). For example, the electronic control unit may be in electronic communication with various actuators, sensors, and other devices within (or outside of) the baler. The ECU 132 may communicate with various other components (including other controllers) in various known ways, including wirelessly. Various alternative locations for the ECU 132 may be utilized, including locations on the towing vehicle 112. It will be understood that one or more electronic control units may be employed, and that ECU(s) 132 may be mounted at various locations on the towing vehicle, baler, or elsewhere. The electronic control unit(s) may be a hardware, software, or hardware and software computing device, and may be configured to execute various computational and control functionality with respect to the baler (or towing vehicle).

Figure 2:
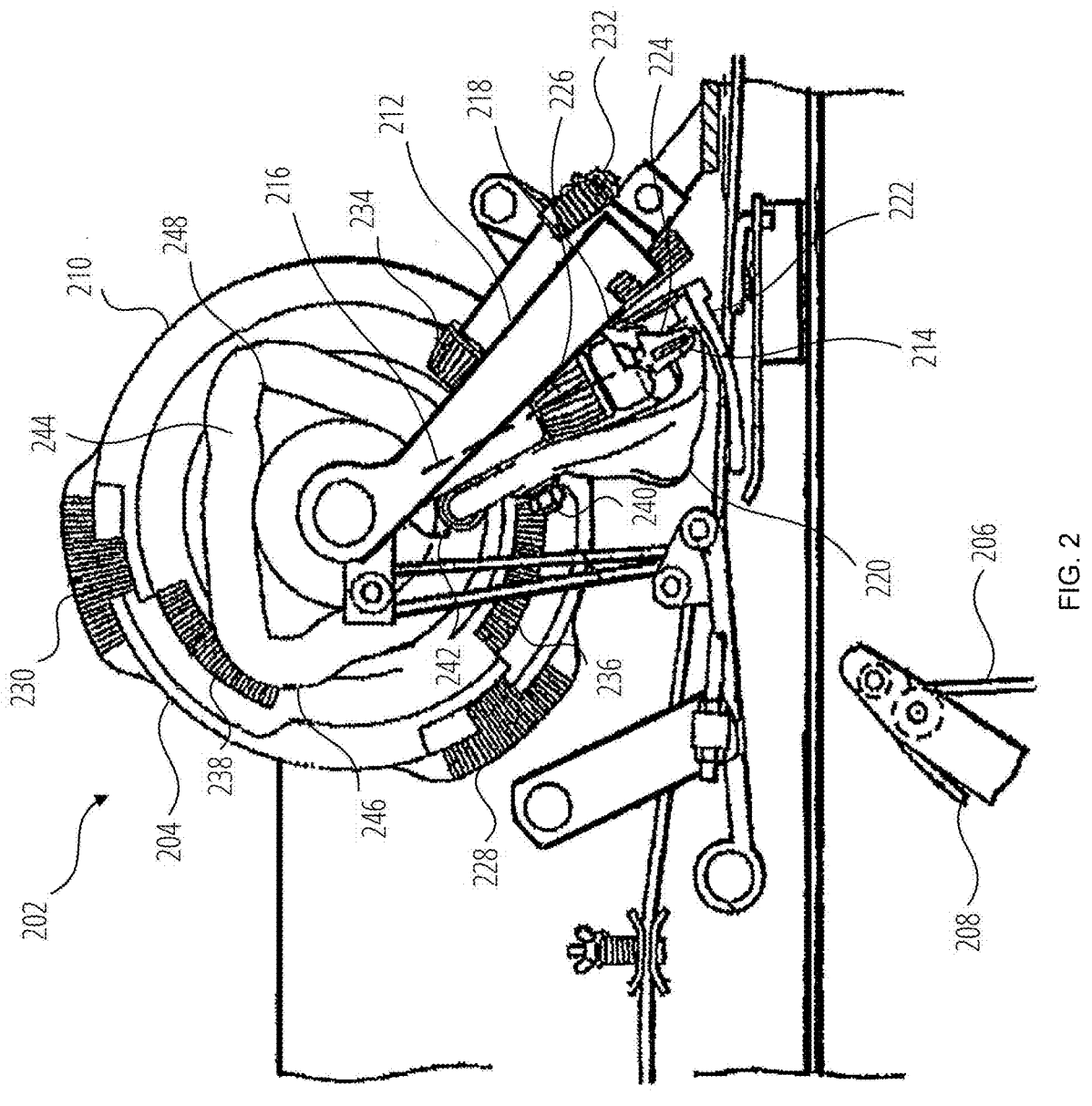
FIG. 2 is an enlarged, fragmentary, side elevational view of the knotter assembly, needle, and associated mechanism in mid cycle.

Turning now to FIG. 2, the baler 110 is provided with a knotter assembly 202 comprising a plurality of knotter mechanisms 204, one of which is shown. In use, in order to provide a strand of binding material to each knotter mechanism 204, a strand of binding material such as twine 206 is drawn from a supply roll provided in a twine box located to a side of the baler 110 through a plurality of twine guides provided in a frame of the baler 110 and through a final twine guide associated with the knotter mechanism 204. Each knotter mechanism 204 is configured to take strands of the twine 206 looped around a formed bale 108 and bind the strands with two knots. The knotter assembly 202 may be similar in many respects to the knotter assembly shown in U.S. Pat. No. 4,074,623. During the bale knotting cycle of the baler 110, needles 208 of each knotter mechanism 204 abruptly pull strands of twine, broadly binding material, and bind the strands with knots in a known manner. In extreme situations, the twine 206 may get tangled and the resulting tension in the strand of twine 206 may cause a mis-tie of the knotter mechanism 204.

The knotter mechanism 204 comprises a generally circular twine disc assembly 210 that is secured to a drive shaft (not shown) for rotation with the latter. The knotter assembly 202 includes a frame 212 that supports a rotary bill hook 214 for rotation about an inclined axis 216 and a twine disc assembly 210 comprising a plurality of individual discs is positioned rearwardly adjacent the bill hook 214 for holding twine 206 in position for engagement by the bill hook 214 during rotation of the latter. The twine 206 is held in the twine disc assembly 210 by a retainer or twine holder 218. As known previously, a wiper arm 220 pivotably mounted to the frame 212 releases the connected strands from the twine disc assembly 210. The lower end of the wiper arm 220 is forked, defining a crotch 222 that opens away from the twine disc assembly 210 beneath the bill hook 214. The crotch 222 carries a knife 224 between the bill hook 214 and the twine disc assembly 210 for severing the twine 206 in response to swinging movement of the wiper arm 220 in the proper direction. Such movement of the wiper arm 220 to operate the knife 224 also serves to engage the proximal areas of the crotch 222 with a knot formed on the bill hook 214 for stripping such knot off the bill hook 214.

In order to transmit driving power from the twine disc assembly 210 to the bill hook 214, the latter is provided with a pinion gear 226 which is disposed for meshing engagement with a pair of circumferentially spaced gear stretches 228 and 230 on the twine disc assembly 210. Similarly, driving power is transmitted to the discs of the twine disc assembly 210 through a worm gear drive 232 and a bevel gear 234 in position for sequential meshing engagement with a pair of circumferentially spaced gear sections 236 and 238 on the twine disc assembly 210. Power to swing the wiper arm 220 about its pivot bolt 240 is obtained through a cam follower 242 at the upper end of the wiper arm 220 beyond the pivot bolt 240 which is disposed within a cam track 244 on the twine disc assembly 210. A pair of circumferentially spaced cam 246 and 248 in the cam track 244 are positioned to sequentially engage the cam follower 242 to operate the latter. As many aspects of the knotter assembly 202 are well known in the art, further details about known aspects of the knotter assembly need to be explained herein.

When the bales reaches a predetermined size (this is determined by an appropriate bale length sensor (not shown)), a trigger engages a suitable clutch understood by one skilled in the art which in turn is connected to a knotter assembly 202. As will be appreciated, the knotter assembly 202 comprises a set of individual knotter mechanisms 204 provided crosswise on top of the bale baling chamber 120 at spaced intervals. Each knotter mechanism 204 has an associated needle 208 for assisting in forming an individual loop around a finished bale. When the bale needs tying, the knotter mechanism 204 and its respective needle 208 is connected to a source of driving power to initiate the tying operation. As the individual knotter mechanisms 204 all operate in an identical manner, it suffices to describe the present invention in relation to only one such knotter mechanism 204. The needle 208 is swingably mounted on the bale baling chamber 120 and is swung back and forth across the bale baling chamber 120 by a suitable linkage as is known in the art. The needle 208 has an "at-home" or rest position fully below the baling chamber 120 and a "full-throw" position extending completely across the baling chamber 120 and twine disc assembly 210.

Figure 3:
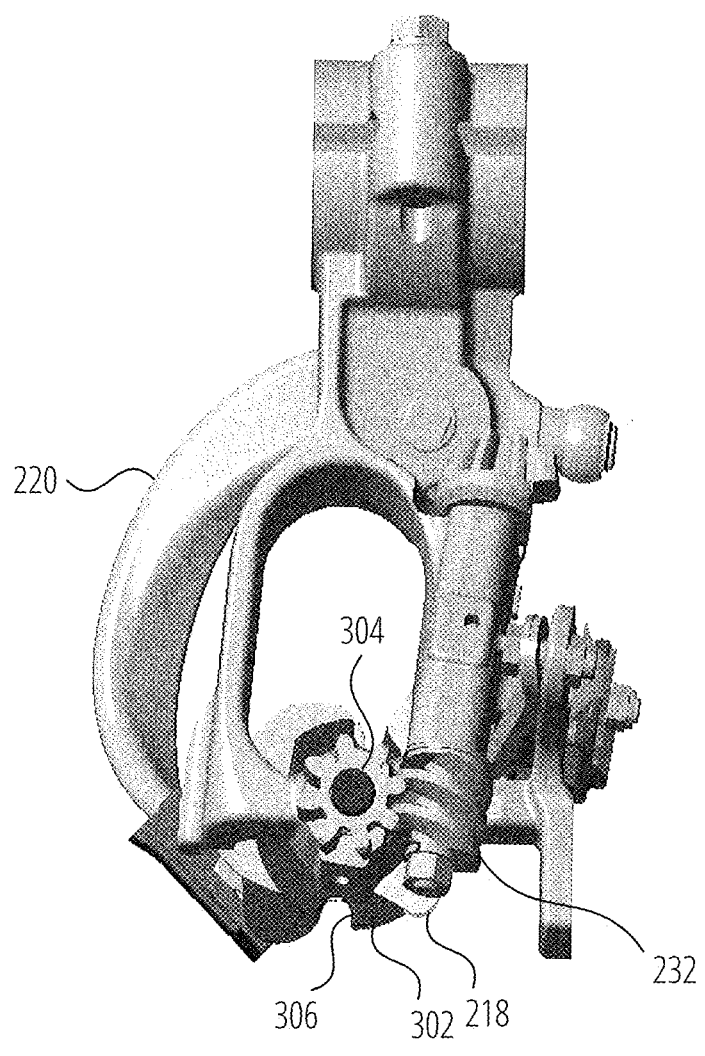
FIG. 3 is a perspective view of portions of the knotter assembly of FIG. 2.

The twine disc assembly 210 comprises a plurality of parallel twine discs 302 (only one of which is seen) mounted for rotation on shaft 304. Desirably, the shaft 304 is driven by the worm gear drive 232 and bevel gear 234 best seen in FIG. 3. Each twine disc 302 has a plurality of notches 306 spaced around an outer circumference of the twine disc 302. As is known in the art, the twine disc assembly 210 is timed such that one of the notches 306 is configured to retain the strands of twine 206 when the knotter assembly 202 is forming the completing knot for the bale that is being completed which is tied first in the tying cycle. A second one of the notches 306 is configured to be used when holding the strands of twine 206 when the knotter assembly 202 is forming the next bale to be formed in the baling chamber 120 In one embodiment, the knotter assembly 202 may perform the knotting cycle as shown in the U.S. Pat. No. 4,074,623 patent. In presenting the strands of twine 206, the needle 208 drapes the twines across the bill hook 214 and thence into one of the notches 306 of the twine disc assembly 210. Rotation of the twine disc assembly 210, in combination with the pressing twine holder 218, causes the strands of twine 206 to be firmly griped preventing their escape as the bill hook 214 begins its rotation. Typically, the twine disc assembly 210 rotates a quarter of a turn and clamps the twines 206 firmly together in one of the notches 306. The needle 208 then moves downward. During the down travel of the needle 208, the two strands of twine 206 on the back of the needle 208 are placed in the next adjacent notch 306 of the twine disc assembly 210. During formation of the first completing knot, the wiper arm 220, and hence the knife 224, swings across the portion of the twine 206 between the bill hook 214 and the twine disc assembly 210, thereby severing the same.

Figure 4:
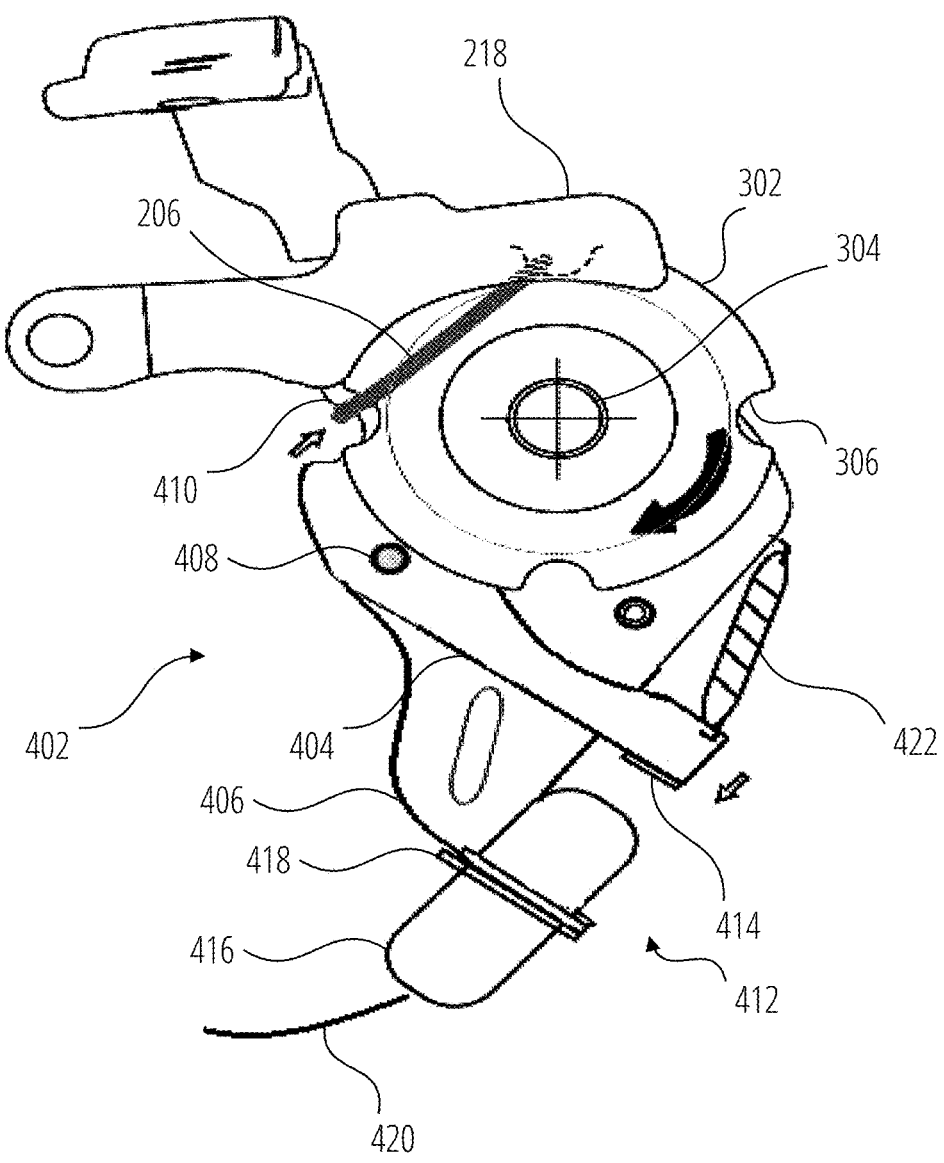
FIG. 4 illustrates an aspect of the subject matter in accordance with one embodiment.
Figure 5:
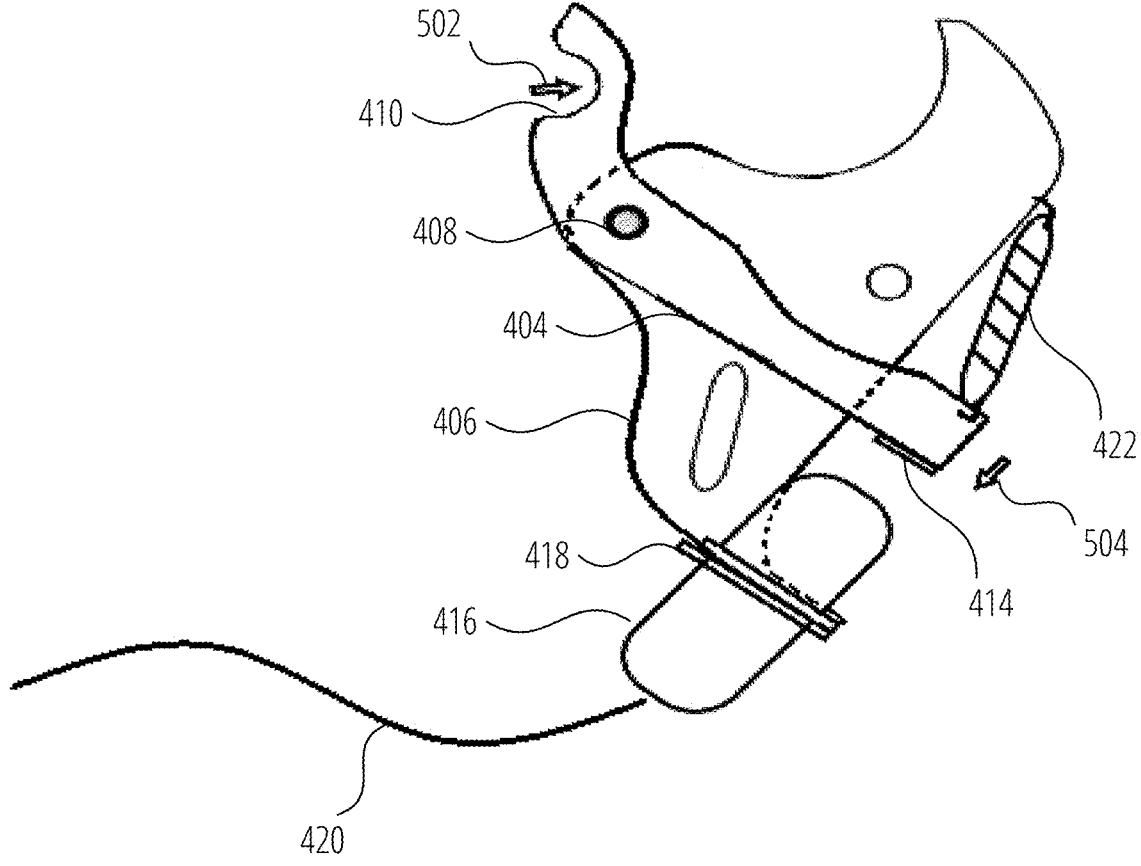
FIG. 5 illustrates an aspect of the subject matter in accordance with one embodiment.

With this brief explanation of the knotter mechanism 204 in mind, the details of an embodiment according to the present invention and as illustrated primarily in FIGS. 4-5 will now be described. The knotter mechanism 204 has a mis-tic detection device 402 configured to monitor if the twine 206, that is to be held taut with the twine holder 218 and twine disc 302, is in a condition that would lead to improper operation of the knotter mechanism 204. When twine 206 is properly held between the twine holder 218 and twine disc 302, the twine 206 is pulled against the twine disc 302 in one of the notches 306. The mis-tie detection device 402 has a position indicator 404 positioned adjacent the twine disc 302. As perhaps best seen in FIG. 5, the position indicator 404 is mounted on a bracket 406 such that the position indicator 404 is able to move. In one embodiment the position indicator 404 moves about pivot 408. Alternately, the position indicator 404 moves in a translational movement. One portion of the position indicator 404 has a twine-receiving groove 410 that aligns with the notch 306 in the twine disc 302 holding the twine 206. The mis-tie detection device 402 also has a sensing mechanism 412 configured to determine the position of the position indicator 404. In the illustrated embodiment, the sensing mechanism 412 includes a contact 414 on a second portion of the position indicator 404 that is configured to interact with a sensor 416 mounted on sensor mount 418. In one embodiment, the sensor 416 is configured to send a suitable signal via cable 420 to determine an operational condition of the knotter mechanism 204, specifically if the twine 206 is in a condition such that a mis-tie of the knotter mechanism 204 will occur.

Desirably, the position indicator 404 has a biasing member 422 causing the position indicator 404 to be biased toward a first condition. In the illustrated embodiment, the biasing member 422 biases the position indicator 404 such that the contact 414 on the position indicator 404 does not freely engage the sensor 416. When twine 206 is properly held by the twine holder 218 on the twine disc 302, the twine 206 will also engage the twine-receiving groove 410 of the position indicator 404 and tension in the twine 206 will cause the position indicator 404 to move as indicated by arrow 502 in FIG. 5 such that the position indicator 404 moves into a second condition. In the second condition, the portion of the position indicator 404 containing the contact 414 is moved towards the sensor 416 as indicated by the arrow 504. The sensor 416 is positioned such that the tension in the twine 206 causes the contact 414 to interact with the sensor 416 so that a signal is sent via cable 420 indicating that the twine 206 is being held in the twine disc 302. If there were to be a problem with the twine 206 such that twine 206 does not move the position indicator 404 to the second condition, the contact 414 will not interact with the sensor 416 and the ECU 132 will determine that a mis-tie has occurred.

While specific arrangements of the position indicator 404, biasing member 422, contact 414 and sensor 416 have been described with the illustrated embodiment, one skilled in the art will understand that other arrangements, such as biasing the position indicator 404 such that the contact 414 interacts with the sensor 416 or that tension in the twine 206 causes the contact 414 to move away from the sensor 416 may be used using sound engineering judgment without departing from the scope of the invention. Additionally, while the sensing mechanism 412 has been shown to include the contact 414 on the position indicator 404 engaging the sensor 416, one skilled in the art will understand that the sensing mechanism 412 may be any known position sensing mechanism capable of measuring the position of the position indicator 404 and sending a signal to the ECU 132 using sound engineering judgment.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

What is claimed is:

1. A knotter assembly for use with a baler, operable to produce a knot in a strands of twine to bind a bale of crop material, the knotter assembly comprising a twine holder for maintaining the twine in a suitable position during the formation of the knots and a twine disc assembly, the twine disc assembly comprising a plurality of parallel discs mounted for rotation on a shaft, wherein each disc of the plurality of discs has a plurality of notches spaced around an outer circumference of the twine disc, the strands being held in the twine disc assembly by the twine holder, wherein the knotter assembly further comprises:

a mis-tie detection device configured to monitor the twine being held with the twine holder in one notch of the plurality of notches of the twine disc, the mis-tie detection device having a position indicator positioned adjacent the twine disc and movable about a pivot, wherein the position indicator has a twine-receiving groove that aligns with the notch in the twine disc such that the twine is simultaneously held in the notch and groove, and tension in the twine during a knotting cycle causes the position indicator to move from a first condition to a second condition, the mis-tie detection device also having a sensing mechanism configured to determine a position of the position indicator.

2. The knotter assembly of claim 1 wherein the mis-tie detection device is configured to monitor if the twine is in a condition that would lead to improper operation of the knotter assembly.

3. The knotter assembly of claim 1 wherein sensing mechanism is connected to a display, and the sensing mechanism sends a signal to the related to an operational condition of the position indicator.

4. The knotter assembly of claim 1 further comprising a biasing member, the biasing member causing the position indicator to be biased toward the first condition and the twine causes the position indicator to move to the second condition.

5. The knotter assembly of claim 1 wherein the sensing mechanism includes a sensor and a contact on the position indicator configured to interact with the switch mounted.

6. The knotter assembly of claim 5 wherein sensing mechanism is connected to a display, and the sensing mechanism sends a signal to the display related to an operational condition of the position indicator.

7. The knotter assembly of claim 6 wherein the display indicates if the position indicator is positioned indicating a position such that a mis-tie of the knotter assembly will occur.

8. The knotter assembly of claim 5 further comprising a biasing member, the biasing member causing the position indicator to be biased toward the first condition and the twine causes the position indicator to move to the second condition.

9. The knotter assembly of claim 8 wherein when the twine is properly held by the twine holder on the twine disc, the twine engages the twine-receiving groove of the position indicator and tension in the twine causes the position indicator to move about the groove such that interaction of the contact with the switch sends a signal to the display indicating that the twine is being held in the twine disc.

10. The knotter assembly of claim 1 wherein when the twine is properly held by the twine holder on the twine disc, the twine engages the twine-receiving groove of the position indicator and tension in the twine causes the position indicator to move about the groove such that interaction of the contact with the switch sends a signal to the display indicating that the twine is being held in the twine disc.

* * * * *